US008533333B2

(12) United States Patent
Yoo et al.

(10) Patent No.: US 8,533,333 B2
(45) Date of Patent: Sep. 10, 2013

(54) SHARED HOSTING USING HOST NAME AFFINITY

(75) Inventors: Won Suk Yoo, Redmond, WA (US); Anil K. Ruia, Issaquah, WA (US); Michael E. Brown, Issaquah, WA (US); William James Staples, Duvall, WA (US); Himanshu Kamarajbhai Patel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 12/203,852

(22) Filed: Sep. 3, 2008

(65) Prior Publication Data
US 2010/0057837 A1 Mar. 4, 2010

(51) Int. Cl.
*G06F 15/173* (2006.01)
(52) U.S. Cl.
USPC ............... 709/226; 709/240; 370/352
(58) Field of Classification Search
USPC ............................................. 709/226
See application file for complete search history.

(56) References Cited

U.S. PATENT DOCUMENTS

| 5,371,852 | A * | 12/1994 | Attanasio et al. ............ 709/245 |
|---|---|---|---|
| 5,918,017 | A * | 6/1999 | Attanasio et al. ............ 709/224 |
| 6,108,703 | A * | 8/2000 | Leighton et al. ............ 709/226 |
| 6,195,680 | B1 * | 2/2001 | Goldszmidt et al. ......... 709/203 |
| 6,374,297 | B1 * | 4/2002 | Wolf et al. ................... 709/226 |
| 6,470,389 | B1 * | 10/2002 | Chung et al. ................. 709/227 |
| 6,865,601 | B1 * | 3/2005 | Cherkasova et al. ......... 709/220 |
| 7,203,764 | B2 | 4/2007 | Jorgenson |
| 7,366,755 | B1 * | 4/2008 | Cuomo et al. ................ 709/204 |
| 7,376,953 | B2 * | 5/2008 | Togasaki ...................... 718/105 |
| 7,406,692 | B2 * | 7/2008 | Halpern et al. ............... 718/105 |
| 7,483,998 | B2 * | 1/2009 | Rabinovitch ................. 709/238 |
| 7,493,400 | B2 * | 2/2009 | Loaiza et al. ................. 709/227 |
| 7,512,707 | B1 * | 3/2009 | Manapragada et al. ...... 709/240 |
| 2001/0052024 | A1 * | 12/2001 | Devarakonda et al. ....... 709/238 |
| 2002/0062372 | A1 * | 5/2002 | Hong et al. ................... 709/225 |
| 2002/0152307 | A1 * | 10/2002 | Doyle et al. .................. 709/225 |
| 2002/0152322 | A1 * | 10/2002 | Hay ............................. 709/245 |
| 2003/0002484 | A1 * | 1/2003 | Freedman .................... 370/352 |
| 2003/0005122 | A1 * | 1/2003 | Freimuth et al. ............. 709/225 |
| 2003/0009562 | A1 * | 1/2003 | Heymann et al. ............ 709/227 |

(Continued)

OTHER PUBLICATIONS

"Shared Hosting Using Application Request Routing (APR)", Internet Document (Available at http://web.archive.org/web/20080731090753/http://learn.iis.net/page.aspx/483/shared-hosting-using-application-request-routing-arr/) Published on Jun. 24, 2008 by pharr, Updated on Jul. 10, 2008 by pharr.*

(Continued)

*Primary Examiner* — Hamza Algibhah
(74) *Attorney, Agent, or Firm* — Workman Nydegger

(57) ABSTRACT

The routing of requests in a shared hosting environment. The shared hosting environment includes a network farm of servers, each capable of processing the request corresponding to the host name. When a request is received, a router determines whether or not there is already a host name affinitization of subset of the servers to the host name corresponding to the request. If so, the message is dispatched to one of those affinitized servers. If not, one or more of the servers are affinitized to the host name to create a subset of affinitized server(s) for that host name. Different host names may have different subsets of servers that they are affinitized to. Over time, the affinitization may be terminated as appropriate.

16 Claims, 4 Drawing Sheets

(56) References Cited

U.S. PATENT DOCUMENTS

| | | | |
|---|---|---|---|
| 2004/0039798 A1* | 2/2004 | Hotz et al. | 709/219 |
| 2004/0054793 A1 | 3/2004 | Coleman | |
| 2004/0268358 A1 | 12/2004 | Darling et al. | |
| 2005/0021848 A1* | 1/2005 | Jorgenson | 709/238 |
| 2005/0177635 A1* | 8/2005 | Schmidt et al. | 709/226 |
| 2006/0143293 A1* | 6/2006 | Freedman | 709/225 |
| 2006/0233155 A1* | 10/2006 | Srivastava | 370/351 |
| 2007/0118667 A1 | 5/2007 | McCarthy et al. | |
| 2007/0118668 A1* | 5/2007 | McCarthy et al. | 709/238 |
| 2007/0150363 A1 | 6/2007 | Patrawala | |
| 2007/0237162 A1 | 10/2007 | Hamanaka et al. | |
| 2007/0239854 A1* | 10/2007 | Janakiraman et al. | 709/218 |
| 2008/0005127 A1* | 1/2008 | Schneider | 707/10 |
| 2008/0027947 A1 | 1/2008 | Pritchett et al. | |
| 2008/0065745 A1* | 3/2008 | Leighton et al. | 709/219 |
| 2008/0141048 A1* | 6/2008 | Palmer et al. | 713/300 |
| 2008/0163064 A1* | 7/2008 | Swildens et al. | 715/736 |
| 2008/0167977 A1* | 7/2008 | Auvenshine et al. | 705/34 |
| 2008/0222291 A1 | 9/2008 | Weller et al. | 709/226 |
| 2008/0222306 A1* | 9/2008 | Bhakta et al. | 709/245 |
| 2008/0282329 A1* | 11/2008 | Shuster | 726/4 |
| 2008/0320484 A1* | 12/2008 | Rosenbach et al. | 718/104 |
| 2009/0070448 A1* | 3/2009 | Pearson et al. | 709/223 |
| 2009/0271798 A1* | 10/2009 | Iyengar et al. | 718/105 |
| 2009/0327517 A1* | 12/2009 | Sivasubramanian et al. | 709/238 |
| 2010/0082787 A1* | 4/2010 | Kommula et al. | 709/223 |

OTHER PUBLICATIONS

"Shared Hosting Using Application Request Routing (APR)", Internet Document (Available at http://learn.iis.net/page.aspx/483/shared-hosting-using-application-request-routing-arr/) Published on Jul. 2, 2008 by pharr Updated on Nov. 5, 2009 by pharr.*

Data Services (6 pages) http://docs.sun.com/app/docs/doc/819-2969/6n57kl13p?a=view, 2008.

RaDaR: A Scalable Architecture for a Global Web Hosting Service (17 pages) http://ce.sejong.ac.kr/~shindk/022_gpe/papers/RaDaR-%20A%20scalable%20architecture%20for%20a%20global%20web%20hosting%20service.pdf, 1999.

Scalable Load Balancing on Distributed Web Servers Using Mobile Agents (14 pages) http://arjuna.newcastle.ac.uk/research/pubs/articles/papers/626.pdf, Oct. 2003.

FLEX: Load Balancing and Management Strategy for Scalable Web Hosting Service (6 pages) http://www.hpl.hp.com/personal/Lucy_Cherkasova/papers/ieee-flex.ps, 2000.

Dynamic Load Balancing on Web-Server Systems (12 pages) http://nclab.kaist.ac.kr/lecture/te628_2001_Fall/seminar/papers/00769420.pdf (May-Jun. 1999).

* cited by examiner

SHARED HOSTING USING HOST NAME AFFINITY

BACKGROUND

The Internet allows access to a wide variety of web sites. Some sites experience heavy traffic and may use large server farms dedicated to servicing a large number of concurrent requests. Examples of such sites might include large on-line book stores, world-wide bidding services, large corporate sites, and so forth. However, lower-traffic (hereinafter also called "smaller") sites also contribute to the wealth and depth of the internet. Those smaller sites may encounter less traffic and may not be actively processing requests all the time. Perhaps such smaller sites may even be inactive most of the time. Examples of such smaller sites include, for example, a family blog that has a very limited number of authors and viewers.

For smaller sites, it is often economically and technically infeasible or at least inconvenient for the site owner to set up a server to actually host the web site. Accordingly, shared hosting service companies have come into being. Smaller web site owner may now hire the hosting service to host the web site. The hosting service will typically have one or more servers that serve a large number of web sites. It is possible, if not likely, to host a large number of web sites on a single server. Given that the shared hosting service provides services to a large number of smaller web sites that are not active all the time, the shared hosting service can have a single server host more web sites than the server would be capable of if the web sites were always active.

For instance, suppose the hosted web sites were on average active less than ten percent of the time. Also, suppose that a given server is capable of hosting 200 active web sites at a time. The shared hosting service might choose to deploy 2000 total web sites on the server in the hopes that the active web sites always stay less than the ten percent amount, thereby allowing the server to effectively service 2000 web sites in an acceptable manner. The success of this approach is dependent on the usage pattern of the host web sites, which may not be predictable in some cases.

However, shared hosting services recognize that trends sometimes change. Accordingly, shared hosting services perform a sort of manual load balancing by periodically checking each of their servers to be verify that the servers are effectively meeting the demands of the ever changing active web sites. In the case where the server is meeting demand by a significant margin and safety factor where the server is meeting demand and still has additional unconsumed resources, the service might choose to deploy additional web sites on that server to effectively maximize the server resources. In the case where the server is not meeting demand, this means that the server is at least at risk of failing to adequately respond to web site requests. In such a case, the hosting service might remove some web sites off of the server, and redeploy them on another, perhaps new, server. As the total number of web sites and/or the average percentage of active web sites increase, the shared hosting service will add new servers. A shared hosting service may have hundreds or even thousands of such servers, each having deployed thereon a large number of web sites. Each of these servers may have a configuration file that is managed by the service.

BRIEF SUMMARY

Embodiments described herein related to the routing of requests in a shared hosting environment. The shared hosting environment includes a network farm of servers, each capable of processing the request corresponding to the host name. When a request is received, a router determines whether or not there is already a host name affinitization of subset of the servers to the host name corresponding to the request. If so, the message is dispatched to one of those affinitized servers. If not, one or more of the servers are affinitized to the host name to create a subset of affinitized server(s) for that host name. Different host names may have different subsets of servers that they are affinitized to.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the principles described herein provide efficient mechanisms to affinitize processing on the basis of host name in a shared hosting environment. First, various embodiments of message processors will be described with respect to FIGS. 1A and 1B. Then, various embodiments of the host name-based affinitization will be described with respect to FIGS. 2 and 3.

Figure 1A:
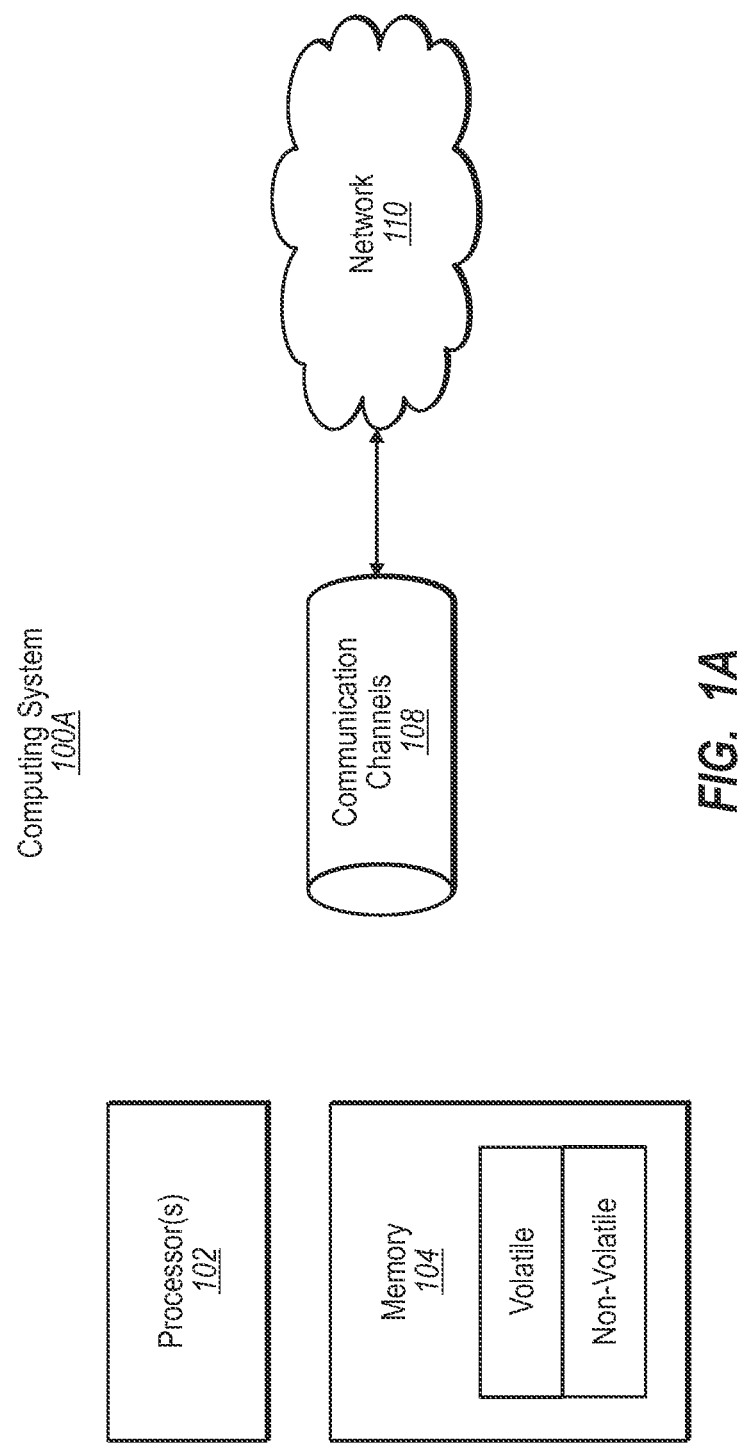
FIG. 1A illustrates a message processor in the form of a computing system that may implement one or more features described herein.

FIG. 1A illustrates a message processor in the form of a computing system 100A. In its most basic configuration, a computing system 100A typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). However, as will be described further below with respect to FIG. 1B, the message processor may be implemented as a state machine as well, perhaps even fully in hardware.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100A.

Computing system 100A may also contain communication channels 108 that allow the computing system 100A to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 1B:
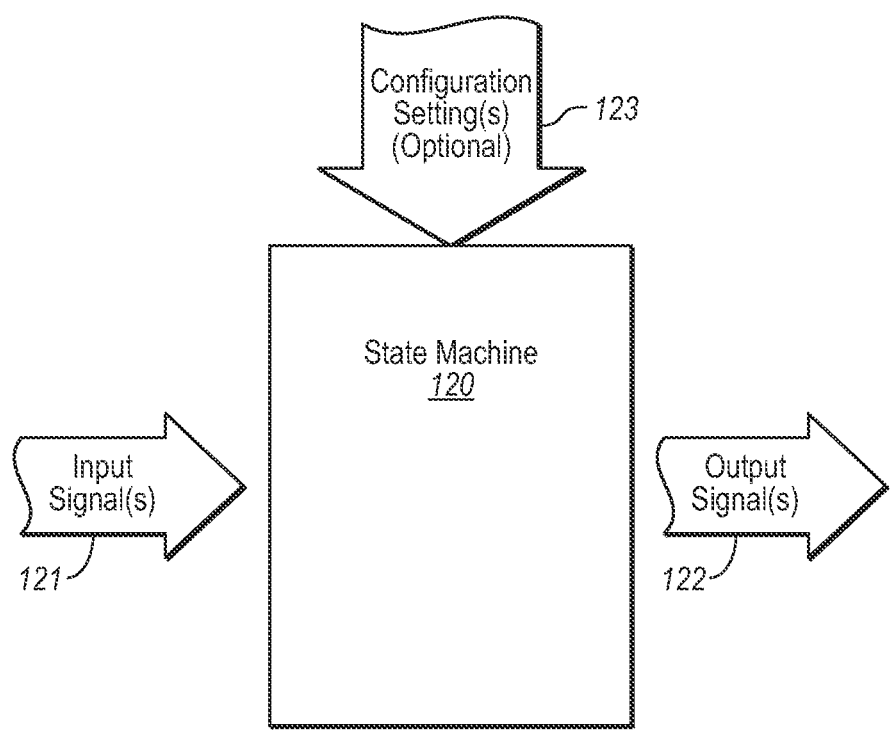
FIG. 1B illustrates a message processor in the form of a state machine that may implement one of more features described herein.

FIG. 1B illustrates a message processor in the form of a state machine 120. A state machine 120 may be implemented entirely in hardware, although that need not be the case. The state machine 120 receives input signal(s) 121, and deterministically generates output signal(s) 122. Optionally, the deterministic function may depend on one or more optional configuration settings 123. In one embodiment, the state machine 120 may be implemented using logic gates and potentially other circuit components such as perhaps registers and clocks. When implemented as a message processor, the state machine 120 may perform the message dispatch described herein.

Now that example message processors have been described, FIG. 2 will now be described, which illustrates a particular messaging processing environment 200. The various illustrated components may be implemented in software or hardware. For instance, if a given component is implemented in software, the computing system 100A of FIG. 1A may cause the components to be created and operated as a result of the processor(s) 102 executing computer-executable instructions from the memory 104. If implemented in hardware, the component may be a computing system or device such as that illustrated with respect to FIG. 1B.

Figure 2:
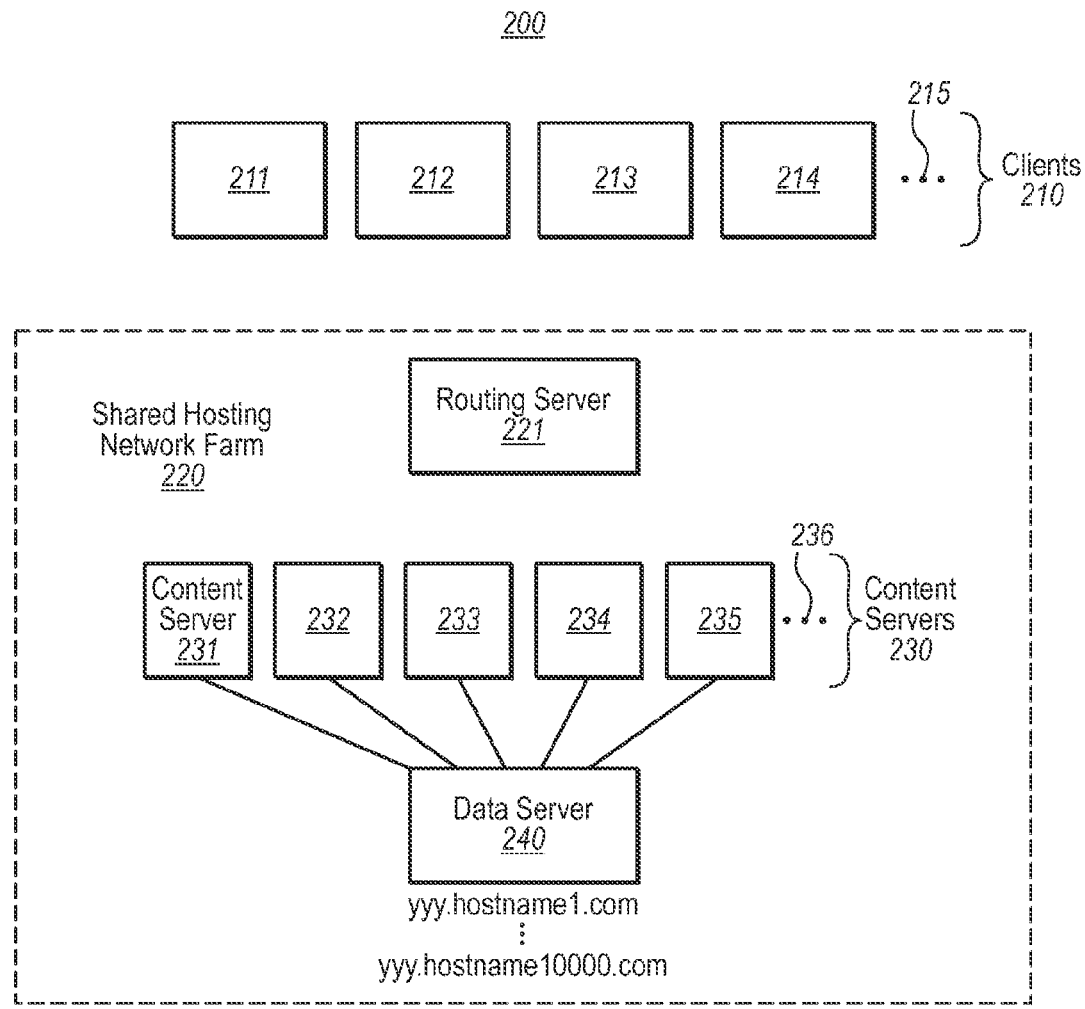
FIG. 2 illustrates a shared hosting environment in which host name affinitization may be employed.

FIG. 2 illustrates a shared hosting environment 200 that includes a number of clients 210 communicating over a network (such as the Internet) with a shared hosting network farm 220. The shared hosting network farm 220 has deployed thereon numerous web sites, each having a corresponding host name. Whenever a client browser navigates to one of the host names that is served by the shared hosting network farm, the client issues a request corresponding to the host name to the shared hosting network farm 220.

In FIG. 2, there are only four clients 211 through 214 shown. However, the ellipses 215 represents that there may be many clients that interface with the shared hosting network farm 220. The set of clients 200 that interface with the network farm 220 may change dynamically as each client, or its user, decides which host names to navigate to in their browser.

At the back-end, the shared hosting environment includes a number of content servers 230. In the illustrated embodiment, there are five content servers 231 through 235 shown. However, the ellipses 236 represents that there may be more or less than this number, and that the number may change dynamically. Indeed, some embodiments described herein permit for quite efficient scaling in the number of content servers.

Conventional shared hosting network farms also can include multiple content servers. However, in FIG. 2, the content servers 230 are each independently capable of processing requests corresponding to a common set of host names. In one specific example that will be frequently referred to herein, the common set of host names includes 10,000 host names including yyy.hostname1.com through yyy.hostname10000.com. Of course, these are not real navigatable host names. For one thing, the term "www" has been changed to "yyy" in this description in order to avoid automatic hyperlinking of the electronic text of published versions of the patent application, which automatic hyperlinking is contrary to the rules of at least one patent office. In addition, the hostnames "hostname1" through "hostname10000" are clearly made up for purposes of discussion only. In a real deployment, the host names would correspond to actual operational and navigatable web sites.

The broader principles described herein are not limited to the specific manner in which each of the content servers 230 is made capable of independently processing requests for the common set of host names. For instance, in one embodiment, each of the content servers 230 includes its own data server that provides files as needed to render each of the web sites corresponding to each of the corresponding host names in the common set of host names. Nevertheless, for improved efficiency and lower cost of deployment, the content servers 230 may share a single data server 240 that includes all files necessary to render each of the web sites of the common set of host names. As each content server 230 processes a request corresponding to a particular host name, the content server will request and receive the corresponding files from the data server 240. Of course, as the number of content servers 230 increases, the number of data servers 240 may likewise be scaled up if needed to handle the increased demand.

As a side note, the content servers 230 and the various other servers illustrated in FIG. 2 will be described as having a certain function. That is not to say that the server is limited to that function. For instance, although each of the content servers is capable of independently processing requests corresponding to a common set of host names, that does not imply that all of the content servers are only able to process host names corresponding to that common set. For instance, a subset of the content servers might be able to process requests corresponding to additional common set of host names. For example, content servers 231 through 233 might be capable of processing request corresponding to the common set yyy.hostname1.com through yyy.hostname10000.com as well as to an addition set of hostnames yyy.hostname10001 through yyy.hostname11000.com. Furthermore, there may be content servers able to process request corresponding to host names that no other content server is capable of processing. For instance, perhaps, content server 231 is also capable of processing requests corresponding to host names yyy.hostname11001.com through yyy.hostname12000.com.

As one final note before returning to the description of FIG. 2, although there are five content servers 231 through 235 illustrated that are capable of processing requests corresponding to the common set of content servers, the shared hosting network farm 220 may, for whatever reason, include other content servers that are not capable of processing requests corresponding to all of the common set of host names. For instance, the five content servers 231 through 235 may process requests for one common set of host names yyy.hostname1.com through yyy.hostname10000.com, while there might be another set of one or more content servers that process requests corresponding to another set of host names, perhaps yyy.hostname10001.com through yyy.hostname20000.com. Nevertheless, for clarity in avoiding such complications, this description will now turn to the simplified example in which the content servers 231 through 235 are described as responding to requests corresponding to the common set of host names yyy.hostname1.com through yyy.hostname10000.com. Responses to other requests will not be described further.

The shared hosting network farm 220 includes a routing server 221 that receives client requests that are to be processed by the shared hosting network farm 220. While the routing server 221 might receive request corresponding to host names that extend out of the common set of host names, it is only the processing of requests corresponding to the common set of host names that will be described in further detail here. The routing server 221, the content servers 230 and the data server 240 may, but need not, be structured as described above for the computing system 100A of FIG. 1A and/or the state machine 120 of FIG. 1B.

When the routing server 221 receives a request corresponding to a host name of the common set of host names, the routing server 221 identifies a content server 230 that will process the request, and dispatches the request to the identified content server. This identification and dispatch occurs in a way that enforces host name affinitization in which at least some of the common set of host names are affinitized. Because of this, the routing server 221 may also be referred to in this description as a routing and affinitization server 221. The routing and affinitization server 221 may also serve to identify an appropriate server based on a load balancing algorithm.

For instance, when the first request for hostname1 is received, or at least when a request for hostname1 is received and there is no active host name affinitization for hostname1, the routing server 221 might select one or more content servers to affinitize the hostname to. As an example, if there are two content servers that are to be affinitized, the routing server 221 might affinitize content servers 231 and 232 to hostname1. These two affinitized content servers may be selected based on a load balancing algorithm. When subsequent requests for hostname1 are received, unless the affinitization has been terminated in the meantime, the request will be dispatched to the affinitized set of content servers 231 and 232. The appropriate one server of the affinitized set of content servers 231 and 232 may also be selected based on the load balancing algorithm.

If a request for hostname2 is received, the affinitization for hostname1 is not relevant, unless the routing server were to affinitize clusters of host names at the same time and hostname1 and hostname2 happened to be in the same cluster of host names. However, in the embodiment described further herein, affinitization occurs on an individual host name basis, although the principles of the present invention are not limited to that. When the request for hostname2 is received, if there was not already an affinitization for hostname2, then the routing server 221 decides an affinitization. In this case, perhaps only one server is affinitized, say content server 233. Subsequently, unless the affinitization is terminated, the content server 223 will process requests for hostname2.

Note that in this example, hostname1 was affinitized to two content servers, whereas hostname2 was affinitized to only one. In one embodiment, each host name may have a different number of affinitizations. Perhaps this is due to the host name provider of hostname1 subscribing to a higher level of service (e.g., two affinitization units) than the host name provider for hostname2. This might be appropriate if, for example, the provider of hostname1 expects somewhat more network traffic than the provider of hostname2, or would like more reliable service. At some point, as the provider of hostname2 experiences even more network traffic, the provider may simply subscribe to yet even more units of affinitization with perhaps an increase in compensation paid to the shared hosting service. Thus, the host provider may stay the decision to implement alternative and perhaps more expensive hosting arrangements such as dedicated hosting services or perhaps even purchasing and setting up their own hosting network. Accordingly, the shared hosting service can tailor shared hosting to a wide variety of customers who have different traffic and reliability needs, creating an expanded business opportunity and customer base for shared hosting services.

Figure 3:
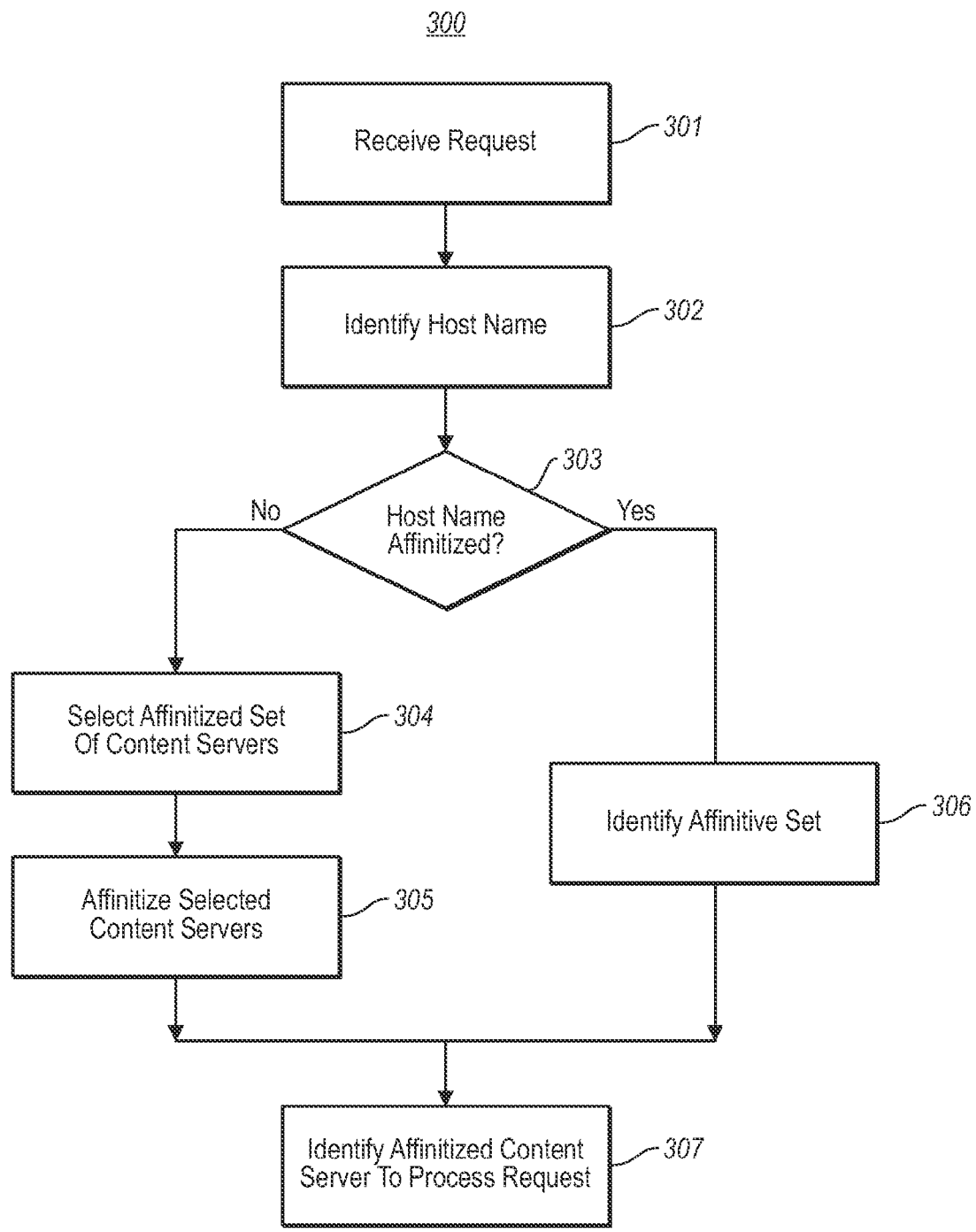
FIG. 3 illustrates a flowchart of a method for responding to a request corresponding to a host name in a shared hosting environment that performs host name affinitization.

While the precise method by which this host name affinitization occurs is not critical to the broader principles described herein, a specific example method will now be described. FIG. 3 illustrates a flowchart of a method 300 for affinitizing a request corresponding to a host name. The method 300 may be initiated by the routing server 221 each time a request corresponding to a host name of the common set of host names is received (act 301).

Upon receiving the request (act 301), the routing server identifies the corresponding host name for the request (act 302). For example, the routing server might identify that the request corresponds to the host name yyy.hostname1.com. The routing server then determines whether or not the corresponding host name is affinitized to any of the content servers 230 (decision block 303).

If there is not already a host name affinitization for the host name to one or more content servers (No in decision block 303), the routing server selects the subset of server(s) to which to affinitize to the host name (act 304). In one embodiment, there may be a cluster of host names that are associated together. For instance, for marketing purposes, an owner of a site may have multiple host names for that site. For instance, a seller of office chairs might have two host names "yyy.comfychairs.com" as well as "yyy.comfortablechairs.com". These two host names may actually be the same site in that the Domain Name Server (DNS) server resolves both names to the same Internet Protocol (IP) address. In such an example, there is no reason to treat them differently. Accordingly, if the request was associated with host name "yyy.comfychairs.com", the act 304 might not only affinitize a set of servers to that host name, but might also affinitize the same set of servers to the associated host name "yyy.comfortablechairs.com" since they are effectively the same site.

As mentioned above, the subset of host name affinitized content servers could be a single affinitized content server, or it could include multiple host name affinitized content servers. If, for example, there is only one content server to be selected for affinitization, the routing server might perform a load balancing algorithm to select the content server that it deems most suitable for processing the request.

In one embodiment, the load balancing algorithm may take into consideration any client affinitizations that might already exist for the client that made the request. Here, we introduce a different type of affinitization called "client affintization", which is not to be confused with "host name affinitization". Client affinitization means that content servers may be selected to process a request based on the client that made the request, whereas host name affinitization means that content servers may be selected to process a request based on the host name corresponding to the request.

Once the set of content server(s) is selected (act 304), the selected content server(s) are host name affinitized to the corresponding host name of the request (act 305). Thus, from that time forward, unless and until the host name affinitization for the affinitized set of content servers is terminated, requests corresponding to that host name will continue to be processed only by one of the affinitized set of content servers.

There might be a number of reasons why a host name affinitization of a particular content server is terminated, one reason is that the associated worker process simply times out. That is, a request corresponding to a host name is not received in a particular configurable amount of time. Since the web sites for the host names are perhaps not used most of the time, this means that affinitization of content servers to host names may often be terminated due to the worker process timing out. Another reason for terminating affinitization is that perhaps the content server has lost its health sufficient to process further requests. In one embodiment, the host name affinitization for a content server is terminated upon the occurrence of the earlier of some configurable time out, and the loss of health of the content server.

If a host name affinitization for a content server is lost, for example, due to loss of health of that content server, and if there are still content servers in the affinitized set for a particular host name, the routing server may actively search for the best suited content server outside of the affinitized set even before the next request corresponding to the host name is received. Alternatively, the routing server may await the determination until the next request for the host name is received.

For instance, if a host name is allotted three unit affinitization units, and a request for the host name is then received. If the set of affinitized content servers has dwindled to just one in that two prior affinitized servers have lost their affinitization to that host name, then the routing server will select two more content servers to affinitize to the host name to thereby restore the allotted total of three host name affinitized content servers.

On the other hand, after the request is received (act 301), and the host name is identified (act 302), if it turns out that there is already an affinitized set of content servers (Yes in decision block 303), then the affinitized set of content servers is identified (act 306). As noted previously, however, if the affinitized set of content servers has dropped below the allotted number of content servers for that particular host name, additional content servers may be selected and affinitized to the host name.

Once the affinitized set of content servers is identified (act 306), a particular one affinitized content server is identified that is to process the request and to which the request corresponding to the host name will be dispatched (act 307). In the trivial case where there is but one affinitized content server in the set, that content server will be the one that processes the request. In the more difficult case where there are multiple affinitized content servers for that host name, the routing server selects one to process the request.

The routing server may make the selection based again on a load balancing algorithm, perhaps selecting the most healthy or available content server in the affinitized set of content servers. In one embodiment, however, the routing server may impose client affinitization. For instance, if there is one server that previously processed a request from a particular client and that corresponded to a host name, the routing server might select that one server again to process another request corresponding to that same host name and corresponding to the same client, even if there are multiple content servers affinitized to that host name.

Accordingly, the principles described herein provide an efficient and perhaps easily scalable mechanism for affinitizing requests in a shared hosting environment. For instance, in order to scale, perhaps all that is performed to add a content server is to allow the content server access to the common data server, and let the routing server know of the existence of the additional content server.

In addition, configuration information may be shared amongst multiple servers since they are all capable of responding to requests for each of the common set of hostnames. This can simplify the configuration management of the shared hosting service. For instance, if an additional content server is added, one may simply give the additional content server access to the common configuration file.

Furthermore, load balancing need not be manually performs since all content servers are capable of responding to requests for web sites in the common set of host names, and a suitable content server is selected at the time a request is received. Finally, reliability can be improved since each content server is capable of responding to requests corresponding to any of the host names in the common set. If one content server goes down, another may also handle the same requests.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for responding to a request corresponding to a host name in a shared hosting environment that includes a network farm comprising a plurality of content servers, the method comprising:

a routing server receiving a request from a client, the request to be processed by at least one server in the plurality of content servers;

the routing server identifying a host name corresponding to the request;

determining whether or not the host name is affinitized to an affinitized subset of servers within the plurality of content servers;

when it is determined that the host name is affinitized to an affinitized subset of servers:

identifying the affinitized subset of the plurality of servers that is host name affinitized to the host name, wherein the affinitization is based upon the individual host name such that two host names which resolve to the same IP address can be affinitized to distinct subsets of servers, wherein the plurality of servers comprises a distinct second subset affinitized to a distinct second host name, wherein each server in the affinitized subset is affinitized to the host name, and wherein each server in the affinitized subset is capable of processing the request corresponding to the host name;

when it is determined that the host name is not affinitized to an affinitized subset of servers within the plurality of content servers, the routing server identifying a new affinitized subset of servers corresponding to the hostname, the new affinitized subset of servers being servers within the plurality of content servers;

determining that a particular content server is to process the request corresponding to the host name, the particular content server within the affinitized subset of the plurality of servers when it is determined that the host name is affinitized to an affinitized subset of servers and the particular content server within the new affinitized subset of servers when it is determined that the host name is not affinitized to an affinitized subset of servers;

the routing server dispatching the request corresponding to the host name to the determined particular content server for processing;

determining that a prior affinitized server has lost its affinitization to the hostname; and in response to determining that a prior affinitized server has lost its affinitization to the hostname, the routing server selecting a new content server to affinitize to the hostname.

2. A method in accordance with claim 1, wherein the affinitized subset includes a single host name affinitized server.

3. A method in accordance with claim 1, wherein the affinitized subset includes multiple host name affinitized servers.

4. A method in accordance with claim 1, wherein determining the particular content server comprises performing a load balancing algorithm to determine which of the plurality of servers is best suited to process the request.

5. A method in accordance with claim 4, wherein the load balancing algorithm factors in client affinitization for the request.

6. A method in accordance with claim 1, wherein when the request is received in the shared hosting environment, the affinitized subset is already affinitized to the host name.

7. A method in accordance with claim 1, wherein only some of the plurality of servers in the network farm are capable of processing the request corresponding to the host name.

8. A method in accordance with claim 1, wherein all of the plurality of servers in the network farm are capable of processing the request corresponding to the host name.

9. A method in accordance with claim 8, wherein all of the plurality of servers in the network farm are capable of independently processing requests for any of the plurality of host names supported by the shared hosting environment.

10. A method in accordance with claim 1, wherein subsequent to dispatching the request, the method further comprises:

determining that a condition for terminating a host name affinitization of the affinitized subset to the host name has occurred; and in response to determining that the condition for terminating the host name affinitization has occurred, terminating the affinitization of the affinitized subset to the host name.

11. A method in accordance with claim 1, wherein subsequent to dispatching the request, the method further comprises:

determining that a condition for terminating a host name affinitization of the particular server to the host name has occurred; and in response to determining that the condition for terminating the host name affinitization of the particular server to the host name has occurred, terminating the affinitization of the particular server to the host name.

12. A method in accordance with claim 11, wherein the condition for terminating comprises the particular server not processing a request for a particular period of time.

13. A method in accordance with claim 11, wherein the condition for terminating comprises the particular server losing health.

14. A method in accordance with claim 11, wherein the condition for terminating comprises either the particular server not processing a request for a particular period of time or the particular server losing health, whichever occurs first.

15. A method in accordance with claim 1, further comprising:

determining that the particular server is client affinitized to a client of the request, wherein determining that a particular server of the subset of the plurality of servers in the network farm is to process the request corresponding to the host name is performed in response to determining that the particular server is client affinitized to the client of the request.

16. A shared hosting network farm that hosts a plurality of host names, the network farm comprising a plurality of content servers each of which comprising one or more computer processors, the network farm comprising:

a plurality of content servers, each independently capable of processing requests corresponding to each host name in a common set of the plurality of host names; and a routing and affinitization server configured to receive requests corresponding to the plurality of host names, and configured to dispatch, based upon host name, at least some of the requests to the plurality of content servers in a manner that enforces host name affinitization in which requests for at least some of the plurality of host names are affinitized to corresponding subsets of the plurality of content servers on the basis of host name, wherein the routing and affinitization servers is configured to perform the following in response to receiving at least some of the received requests:
- identifying the corresponding host name for the request, wherein the corresponding host name is included in the common set of host names;
- determining whether there is a host name affinitization for the host name which associates the host name with a first set of one or more affinitized content servers, wherein the affinitization is based upon the individual host name such that two host names which resolve to the same IP address can be affinitized to distinct sets of one or more content servers;
- when there is not a host name affinitization to one or more content servers within the plurality of content servers, affinitizing the host name to a second set of one or more content servers, each of the second set of one or more content servers being within the plurality of content servers;
- when there is a host name affinitization to one or more content servers, identifying the first set of one or more affinitized content servers;
- identifying a particular affinitized content server to which to dispatch the request corresponding to the host name, the particular affinitized content server within the first set of one or more affinitized content servers when there is a host name affinitization and the particular content server within the second set of one or more content servers when there is not a host name affinitization;
- dispatching the request to the particular affinitized content server;
- determining that a prior affinitized server has lost its affinitization to the host name; and
- in response to determining that a prior affinitized server has lost its affinitization to the hostname, the routing server selecting a new content server to affinitize to the host name.

* * * * *